United States Patent
Kondamudi

(10) Patent No.: US 12,003,510 B2
(45) Date of Patent: Jun. 4, 2024

(54) METHOD FOR PERFORMING UNIFICATION OF DATA ON COMPUTING DEVICE ACROSS APPLICATION INSTALL-REINSTALL ADHERING TO GDPR

(71) Applicant: WizRocket Inc., Mountain View,, CA (US)

(72) Inventor: Suresh Kondamudi, Mumbai (IN)

(73) Assignee: WizRocket Inc., Mountain View, CA (US)

(*) Notice: Subject to any disclaimer, the term of this patent is extended or adjusted under 35 U.S.C. 154(b) by 363 days.

(21) Appl. No.: 17/644,579

(22) Filed: Dec. 16, 2021

(65) Prior Publication Data

US 2023/0198985 A1 Jun. 22, 2023

(51) Int. Cl.
*H04L 9/40* (2022.01)
*G06F 8/61* (2018.01)
*G06F 16/22* (2019.01)
*H04L 9/06* (2006.01)

(52) U.S. Cl.
CPC ...... *H04L 63/0892* (2013.01); *G06F 16/2255* (2019.01); *H04L 9/0643* (2013.01); *G06F 8/62* (2013.01)

(58) Field of Classification Search
CPC .......... G06F 8/60; G06F 8/62; G06F 16/2255; H04L 9/0643; H04L 63/0892
See application file for complete search history.

(56) References Cited

U.S. PATENT DOCUMENTS

| | | | |
|---|---|---|---|
| 11,500,879 B2* | 11/2022 | Su | G06F 16/2255 |
| 11,650,981 B1 | 5/2023 | Kondamudi et al. | |
| 2012/0271909 A1 | 10/2012 | Huang et al. | |
| 2015/0281104 A1 | 10/2015 | Golshan et al. | |
| 2017/0004324 A1 | 1/2017 | Seo et al. | |
| 2017/0060957 A1 | 3/2017 | Saladi et al. | |
| 2017/0177266 A1* | 6/2017 | Doerner | G06F 3/0689 |
| 2017/0295246 A1 | 10/2017 | Georgiou et al. | |
| 2019/0018965 A1* | 1/2019 | Hoscheit | H04L 63/1408 |
| 2020/0057752 A1 | 2/2020 | Tofano | |
| 2020/0396072 A1 | 12/2020 | Maurer et al. | |
| 2021/0099462 A1* | 4/2021 | Curtis | H04L 63/083 |
| 2021/0191629 A1* | 6/2021 | Vibhor | G06F 3/0659 |
| 2022/0019995 A1 | 1/2022 | Ngo et al. | |
| 2022/0070245 A1* | 3/2022 | Ravala | G06F 16/2255 |
| 2022/0094739 A1* | 3/2022 | Vestemean | H04L 9/0643 |
| 2022/0129468 A1* | 4/2022 | Su | G06F 3/067 |
| 2023/0185787 A1 | 6/2023 | Kondamudi et al. | |

* cited by examiner

*Primary Examiner* — Techane Gergiso
(74) *Attorney, Agent, or Firm* — Kolisch Hartwell, P.C.

(57) ABSTRACT

The present disclosure provides a system that performs a method for performing unification of data for identifying a user on computing device after reinstalling the application adhering to GDPR compliance. The method includes a first step of receiving a first set of data associated with the computing device. The method includes another step of mapping the first set of data to a first natural number of a plurality of natural numbers using an increment sequence method. The method includes yet another step of hashing of the first set of data in real-time. The method includes yet another step of assigning a first shard index of a plurality of shard indexes to the first set of data based on the first natural number of the plurality of natural numbers. The method includes yet another step of sending the first shard index of the plurality of shard indexes to the server.

18 Claims, 4 Drawing Sheets

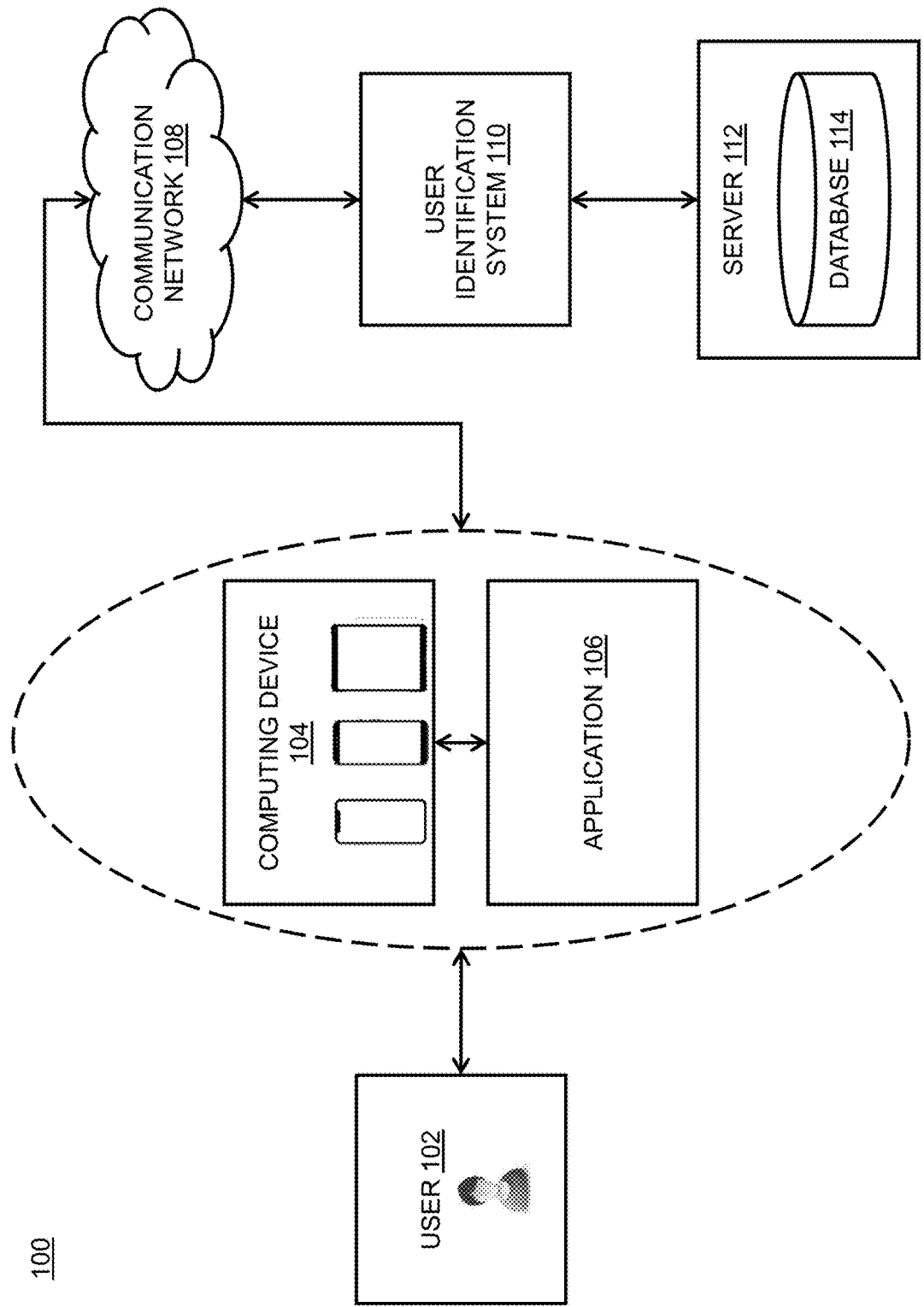

METHOD FOR PERFORMING UNIFICATION OF DATA ON COMPUTING DEVICE ACROSS APPLICATION INSTALL-REINSTALL ADHERING TO GDPR

TECHNICAL FIELD

The present disclosure relates to the field of communication technology, and in particular, relates to a method and system for performing identification of a user on a computing device after reinstalling an application.

INTRODUCTION

Nowadays, computing devices are used to perform various functions, such as execution of applications, receiving input from a user, performing processing on the received input, outputting the result to the user, and so on. The computing devices perform various functions through the execution of various applications. The various applications may include travel-based applications, e-commerce applications, email or messaging applications, and so on. In addition, a user may install, uninstall and reinstall the applications in the computing device as per their preference. Conventionally, identifier information such as UUID (universally unique identifier) or GUID (globally unique identifier) may be stored at the server for identification of the user. Generally, UUID or GUID is generated when the application is installed for the first time in the computing device. However, the value of UUID or GUID changes after the application is reinstalled in the computing device by the user. Further, the value of UUID or GUID is application specific and changes from application to application. Furthermore, unique identifier information such as AD-ID or IDFA may be stored for Android-based devices and iOS-based devices respectively for identification of the user. AD-ID or IDFA is device specific identification information that remains same irrespective of different applications that may be installed on the computing device. However, the AD-ID or IDFA information associated with the computing device cannot be shared to the server as per GDPR compliance standard. Generally, GDPR (General Data Protection Regulation) is protection in EU law for data protection and privacy of information of the user. Also, AD-ID or IDFA information may be accessed by only advertisers. In light of the above discussion, there is a need to perform unification of data of a user on a computing device across application installation re-installation adhering to GDPR compliance standard.

SUMMARY

In a first example, a computer-implemented method is provided. The computer-implemented method for performing unification of data for identifying a user on at least one computing device after reinstalling at least one application on the at least one computing device adhering to GDPR compliance. The computer-implemented method includes a first step of receiving a first set of data associated with the at least one computing device. The computer-implemented method includes another step of mapping the first set of data to a first natural number of a plurality of natural numbers using an increment sequence method. The computer-implemented method includes yet another step of hashing of the first set of data in real-time. The computer-implemented method includes yet another step of assigning a first shard index of a plurality of shard indexes to the first set of data based on the first natural number of the plurality of natural numbers. The computer-implemented method includes yet another step of sending the first shard index of the plurality of shard indexes to the server upon request from the server. The computer-implemented method includes yet another step of obtaining a second set of data associated with the at least one computing device of the user. The computer-implemented method includes yet another step of mapping a second set of data to a second natural number of the plurality of natural numbers. The computer-implemented method includes yet another step of unifying the first natural number and the second natural number for identifying and associating the first shard index of the plurality of shard indexes for the user after reinstalling of the application in the computing device. The computer-implemented method includes yet another step of assigning the first shard index of the plurality of shard indexes to the second set of data associated with the user. The computing device is associated with the user. The first set of data is unique identification information of the computing device associated with the user. The increment sequence method enables generation of natural number of the plurality of natural numbers in an incremented way in a number sequence. The user identification system performs the hashing of the first set of data using a hash function. The user identification system performs hashing of the first set of data for enhancing security of the first set of data. The first shard index of the plurality of shard indexes facilitates storing of the first set of data in corresponding shard of the plurality of shards based on shard indexing process. The first shard index of the plurality of shard indexes is assigned upon installation of the application for first time in the computing device associated with the user. The shard indexing process utilizes a shard modular operation. The shard modular operation is based on number of the plurality of shards and number of the plurality of natural numbers. The sending of the first shard index of the plurality of shard indexes adheres to GDPR compliance standard. The second set of data is associated with the computing device of the user. The mapping is performed based on information of the first shard index of the plurality of shard indexes. The mapping is performed after reinstalling of the application in the computing device. The mapping is performed upon detection that the hash of the second set of data equals the hash of the first set of data and the hash of the first set of data is already stored at the server. The first shard index of the plurality of shard indexes facilitates storing of data of the user in same shard of the plurality of shard indexes based on shard indexing process.

In an embodiment of the present disclosure, the first set of data includes at least one of AD-ID (advertising digital identifier) of the computing device, IDFA (identifier for advertisers) of the computing device, IMEI (international mobile equipment identity) of the computing device, or any other unique identification information associated with the computing device.

In an embodiment of the present disclosure, the user identification system derives the first shard index of the plurality of shard indexes in real-time after reinstalling the application in the computing device associated with the user. The user identification system derives the first shard index of the plurality of shard indexes based on checking of the second set of data already stored at the server.

In an embodiment of the present disclosure, the user identification system minimizes data migration and data loss at the server after uninstalling and reinstalling of the application at the computing device of the user.

In an embodiment of the present disclosure, the shard indexing process enables the user identification system for storing the first set of data and the second set of data in same shard of the plurality of shards. The shard indexing process utilizes modulo operation on the first set of data and the second set of data for allocating corresponding shard of the plurality of shards.

In an embodiment of the present disclosure, number of the plurality of shard indexes depend on the first set of data.

In a second example, a computer system is provided. The computer system includes one or more processors and a memory. The memory is coupled to the one or more processors. The instructions cause the one or more processors to perform a method for performing unification of data for identifying a user on at least one computing device after reinstalling at least one application on the at least one computing device adhering to GDPR compliance. The method includes a first step of receiving a first set of data associated with the at least one computing device. The method includes another step of mapping the first set of data to a first natural number of a plurality of natural numbers using an increment sequence method. The method includes yet another step of hashing of the first set of data in real-time. The method includes yet another step of assigning a first shard index of a plurality of shard indexes to the first set of data based on the first natural number of the plurality of natural numbers. The method includes yet another step of sending the first shard index of the plurality of shard indexes to the server upon request from the server. The method includes yet another step of obtaining a second set of data associated with the at least one computing device of the user. The method includes yet another step of mapping a second set of data to a second natural number of the plurality of natural numbers. The method includes yet another step of unifying the first natural number and the second natural number for identifying and associating the first shard index of the plurality of shard indexes for the user after reinstalling of the application in the computing device. The method includes yet another step of assigning the first shard index of the plurality of shard indexes to the second set of data associated with the user. The computing device is associated with the user. The first set of data is unique identification information of the computing device associated with the user. The increment sequence method enables generation of natural number of the plurality of natural numbers in an incremented way in a number sequence. The user identification system performs the hashing of the first set of data using a hash function. The user identification system performs hashing of the first set of data for enhancing security of the first set of data. The first shard index of the plurality of shard indexes facilitates storing of the first set of data in corresponding shard of the plurality of shards based on shard indexing process. The first shard index of the plurality of shard indexes is assigned upon installation of the application for first time in the computing device associated with the user. The shard indexing process utilizes a shard modular operation. The shard modular operation is based on number of the plurality of shards and number of the plurality of natural numbers. The sending of the first shard index of the plurality of shard indexes adheres to GDPR compliance standard. The second set of data is associated with the computing device of the user. The mapping is performed based on information of the first shard index of the plurality of shard indexes. The mapping is performed after reinstalling of the application in the computing device. The mapping is performed upon detection that the hash of the second set of data equals the hash of the first set of data and the hash of the first set of data is already stored at the server. The first shard index of the plurality of shard indexes facilitates storing of data of the user in same shard of the plurality of shard indexes based on shard indexing process.

In an embodiment of the present disclosure, the first set of data includes at least one of AD-ID (advertising digital identifier) of the computing device, IDFA (identifier for advertisers) of the computing device, IMEI (international mobile equipment identity) of the computing device, or any other unique identification information associated with the computing device.

In an embodiment of the present disclosure, the user identification system derives the first shard index of the plurality of shard indexes in real-time after reinstalling the application in the computing device associated with the user. The user identification system derives the first shard index of the plurality of shard indexes based on checking of the second set of data already stored at the server.

In an embodiment of the present disclosure, the user identification system minimizes data migration and data loss at the server after uninstalling and reinstalling of the application at the computing device of the user.

In an embodiment of the present disclosure, the shard indexing process enables the user identification system for storing the first set of data and the second set of data in same shard of the plurality of shards. The shard indexing process utilizes modulo operation on the first set of data and the second set of data for allocating corresponding shard of the plurality of shards.

In an embodiment of the present disclosure, number of the plurality of shard indexes depend on the first set of data.

In a third example, a non-transitory computer-readable storage medium is provided. The non-transitory computer-readable storage medium encodes computer executable instructions. The computer executable instructions are executed by at least one processor to perform a method for performing unification of data for identifying a user on at least one computing device after reinstalling at least one application on the at least one computing device adhering to GDPR compliance. The method includes a first step of receiving a first set of data associated with the at least one computing device. The method includes another step of mapping the first set of data to a first natural number of a plurality of natural numbers using an increment sequence method. The method includes yet another step of hashing of the first set of data in real-time. The method includes yet another step of assigning a first shard index of a plurality of shard indexes to the first set of data based on the first natural number of the plurality of natural numbers. The method includes yet another step of sending the first shard index of the plurality of shard indexes to the server upon request from the server. The method includes yet another step of obtaining a second set of data associated with the at least one computing device of the user. The method includes yet another step of mapping a second set of data to a second natural number of the plurality of natural numbers. The method includes yet another step of unifying the first natural number and the second natural number for identifying and associating the first shard index of the plurality of shard indexes for the user after reinstalling of the application in the computing device. The method includes yet another step of assigning the first shard index of the plurality of shard indexes to the second set of data associated with the user. The computing device is associated with the user. The first set of data is unique identification information of the computing device associated with the user. The increment sequence method enables generation of natural number of the plurality of natural numbers in an incremented way in a number sequence. The user identification system performs the hashing of the first set of data using a hash function. The user identification system performs hashing of the first set of data for enhancing security of the first set of data. The first shard index of the plurality of shard indexes facilitates storing of the first set of data in corresponding shard of the plurality of shards based on shard indexing process. The first shard index of the plurality of shard indexes is assigned upon installation of the application for first time in the computing device associated with the user. The shard indexing process utilizes a shard modular operation. The shard modular operation is based on number of the plurality of shards and number of the plurality of natural numbers. The sending of the first shard index of the plurality of shard indexes adheres to GDPR compliance standard. The second set of data is associated with the computing device of the user. The mapping is performed based on information of the first shard index of the plurality of shard indexes. The mapping is performed after reinstalling of the application in the computing device. The mapping is performed upon detection that the hash of the second set of data equals the hash of the first set of data and the hash of the first set of data is already stored at the server. The first shard index of the plurality of shard indexes facilitates storing of data of the user in same shard of the plurality of shard indexes based on shard indexing process.

In an embodiment of the present disclosure, the first set of data includes at least one of AD-ID (advertising digital identifier) of the computing device, IDFA (identifier for advertisers) of the computing device, IMEI (international mobile equipment identity) of the computing device, or any other unique identification information associated with the computing device.

In an embodiment of the present disclosure, the user identification system derives the first shard index of the plurality of shard indexes in real-time after reinstalling the application in the computing device associated with the user. The user identification system derives the first shard index of the plurality of shard indexes based on checking of the second set of data already stored at the server.

In an embodiment of the present disclosure, the user identification system minimizes data migration and data loss at the server after uninstalling and reinstalling of the application at the computing device of the user.

In an embodiment of the present disclosure, the shard indexing process enables the user identification system for storing the first set of data and the second set of data in same shard of the plurality of shards. The shard indexing process utilizes modulo operation on the first set of data and the second set of data for allocating corresponding shard of the plurality of shards.

BRIEF DESCRIPTION OF THE DRAWINGS

Figure 2A:
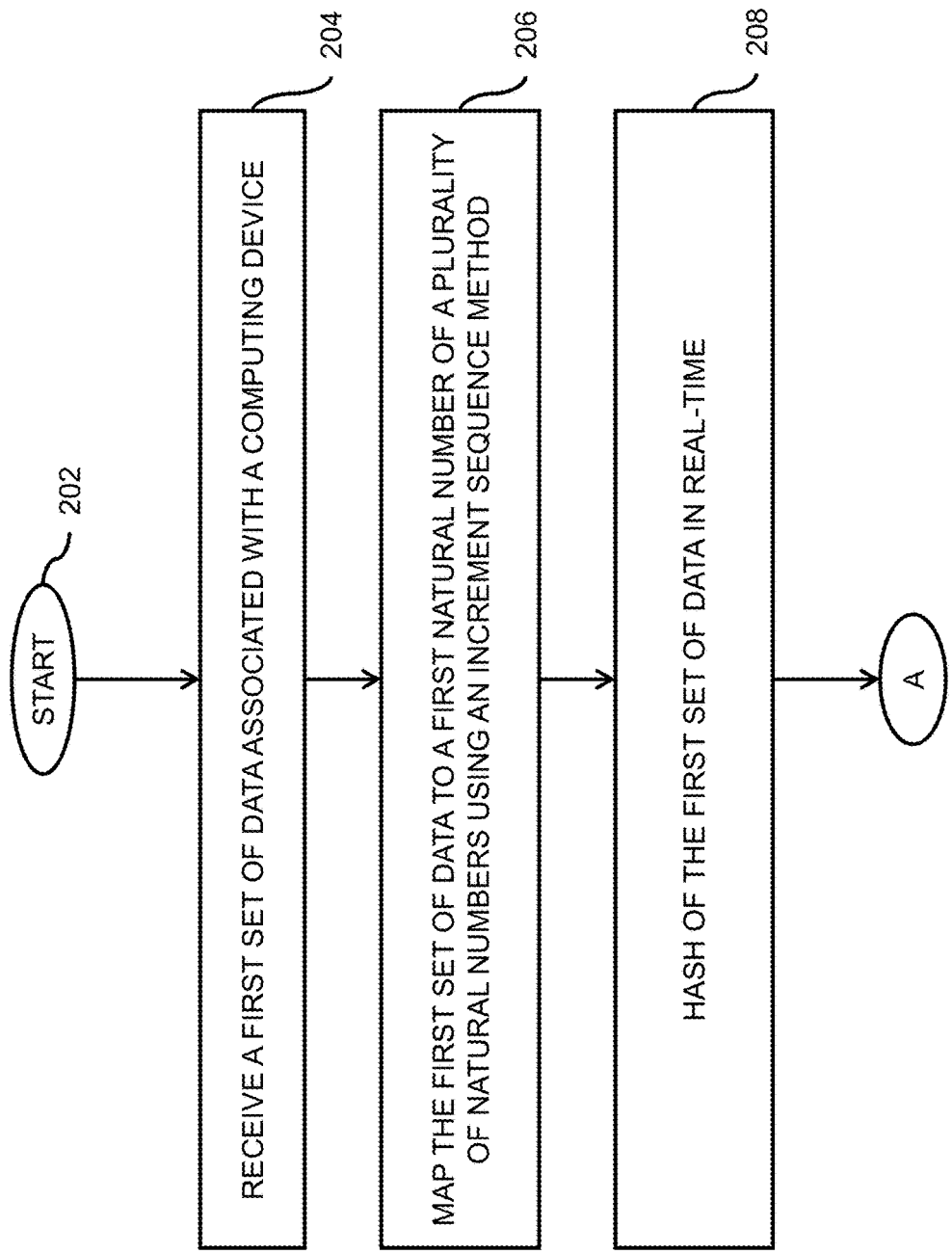
Figure 2B:
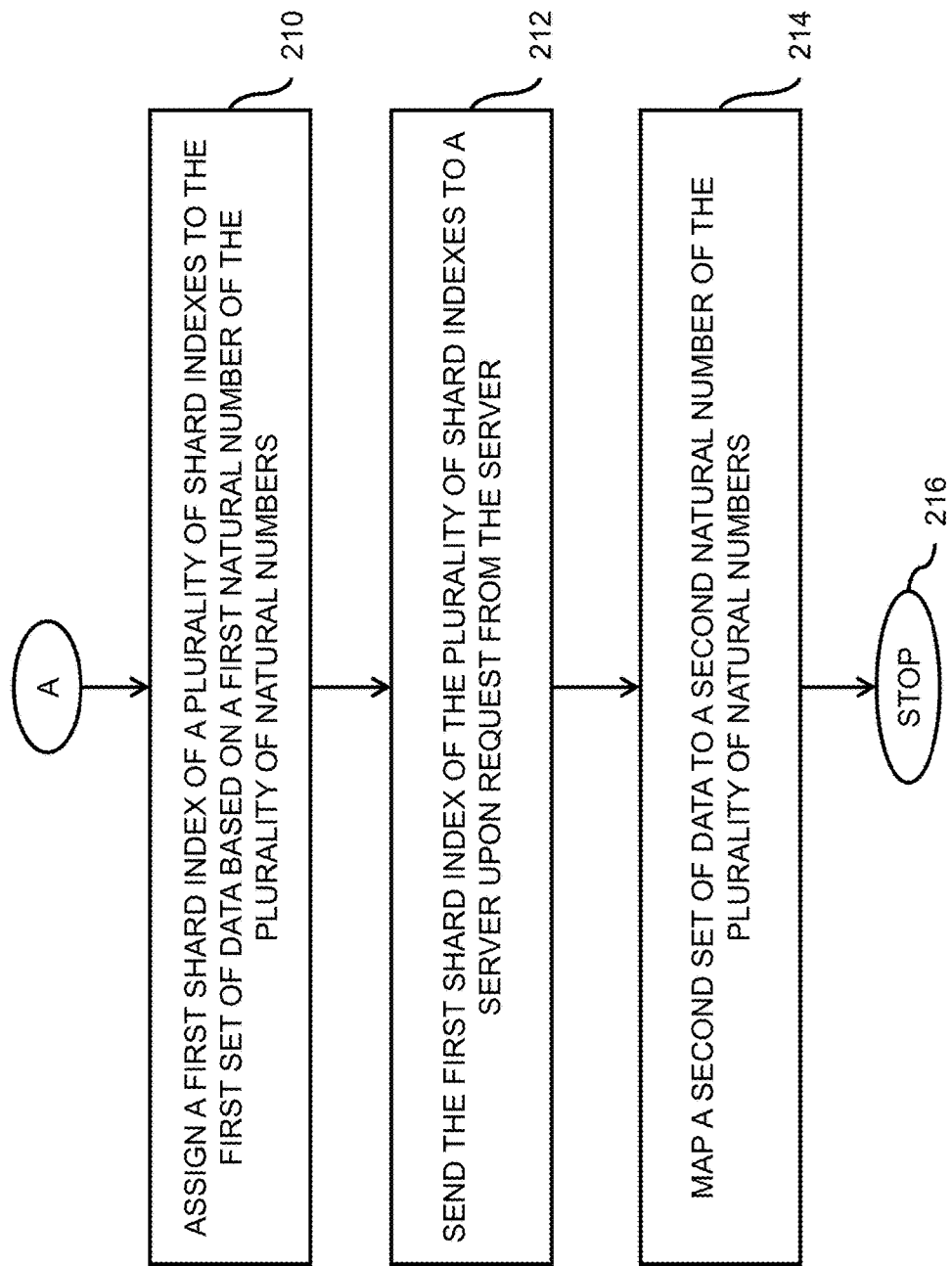
Figure 3:
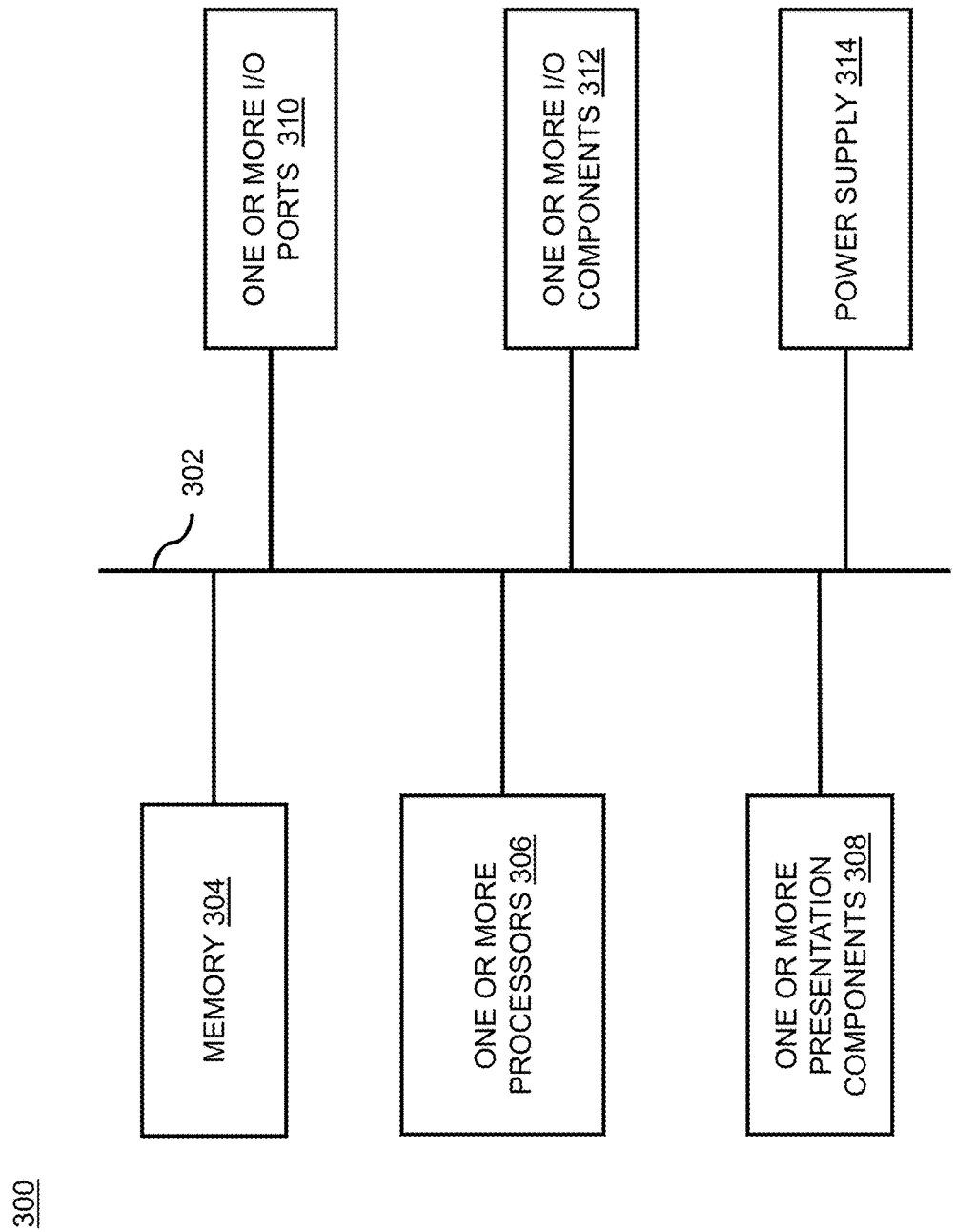

Having thus described the invention in general terms, references will now be made to the accompanying figures, wherein:

FIG. 1 illustrates an interactive computing environment for performing identification of a user on at least one computing device after reinstalling of an application on the at least one computing device, in accordance with various embodiments of the present disclosure;

FIGS. 2A and 2B illustrate a flow chart of a method for performing identification of the user on the at least one computing device after reinstalling of the application on the at least one computing device, in accordance with various embodiments of the present disclosure; and FIG. 3 illustrates a block diagram of the computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 for performing identification of a user 102 on at least one computing device 104 after reinstalling of an application 106 on the at least one computing device 104, in accordance with various embodiments of the present disclosure. The interactive computing environment 100 includes the user 102, the computing device 104, the application 106, and a communication network 108. In addition, the interactive computing environment 100 includes a user identification system 110, a server 112, and a database 114.

The user identification system 110 associates an anonymous profile with an identified profile. In addition, the user identification system 110 encounters the anonymous profile when the user 102 visits and browses the application 106 for first time. Further, the user identification system 110 performs database management for the application 106. Furthermore, the user identification system 110 stores and manages data associated with the anonymous profile and the identified profile for the application 106.

The user 102 is any person that runs the application 106 on the computing device 104. In an embodiment of the present disclosure, the user 102 is a person that installs the application 106 in the computing device 104. In another embodiment of the present disclosure, the user 102 is a person that uninstalls the application 106 from the computing device 104. In yet another embodiment of the present disclosure, the user 102 is a person that reinstalls the application 106 in the computing device 104. In yet another embodiment of the present disclosure, the user 102 is any person that operates the computing device 104.

The interactive computing environment 100 includes the computing device 104. The computing device 104 is associated with the user 102. The invention is explained in terms of a single computing device. However, the user 102 may be associated with more number of computing devices. In an example, the user 102 may buy a new computing device and reinstall any applications again on the new computing device. The computing device 104 is any computer system which mainly comprises a random access memory, a non-volatile storage system, and a display panel. Random access memory is form of data storage that stores data and machine code currently in use. In addition, random access memory allows data to be read or written in almost same amount of time irrespective of physical location of data inside random access memory. Further, random access memory is faster in speed than a solid state drive or a hard disk drive.

Furthermore, random access memory installed inside the computing device 104 is of any suitable size based on requirement of the user 102. In an example, random access memory is of 8 GB. In another example, random access memory is of 16 GB. In yet another example, random access memory is of any other capacity of the like. The computing device 104 includes non-volatile storage system. Non-volatile storage system stores data even after power failure or shutdown of the computing device 104. In an example, non-volatile storage system includes but may not be limited to hard disk drive, solid state drive and optical drives.

In an embodiment of the present disclosure, the computing device 104 is a portable computing device. In an example, the portable computer system includes laptop, tablet, smartphone and the like. In an example, smartphone is at least one of an Apple smartphone, an Android-based smartphone, a Windows-based smartphone and the like. In another embodiment of the present disclosure, the computing device 104 is a fixed computer system. In an example, fixed computer system includes a desktop, a workstation PC and the like.

In addition, the computing device 104 requires an operating system to install and load the application 106 in the computing device 104. Further, operating system is system software that manages hardware and software resources and provides common services for computer programs. In addition, operating system acts as an interface for the application 106 installed in the computing device 104 to interact with random access memory or other hardware components of the computing device 104. In an embodiment of the present disclosure, operating system installed in the computing device 104 is a mobile operating system. In another embodiment of the present disclosure, the computing device 104 runs on any suitable operating system designed for portable computer system.

In an example, mobile operating system includes but may not be limited to Windows operating system from Microsoft, Android operating system from Google, iOS operating system from Apple, Symbian based operating system from Nokia, Bada operating system from Samsung Electronics and BlackBerry operating system from BlackBerry. In an embodiment of the present disclosure, operating system is not limited to the above mentioned operating systems. In addition, the computing device 104 runs on any version of the above mentioned operating systems.

In another embodiment of the present disclosure, the computing device 104 runs on any suitable operating system designed for fixed computer system. In an example, operating system installed in the computing device 104 is Windows from Microsoft. In another example, operating system installed in the computing device 104 is Mac from Apple. In yet another example, operating system installed in the computing device 104 is Linux based operating system. In yet another example, operating system installed in the computing device 104 is UNIX, *Kali* Linux, and the like.

In an embodiment of the present disclosure, the computing device 104 runs on any version of Windows operating system. In another embodiment of the present disclosure, the computing device 104 runs on any version of Mac operating system. In yet another embodiment of the present disclosure, the computing device 104 runs on any version of Linux operating system. In yet another embodiment of the present disclosure, the computing device 104 runs on any version of the above mentioned operating systems.

In an embodiment of the present disclosure, the computing device 104 includes display panel to interact with the application 106. In addition, the computing device 104 includes display panel to display results fetched from the application 106. In an embodiment of the present disclosure, the computing device 104 includes an advanced vision display panel. Advanced vision display panel includes OLED, AMOLED, Super AMOLED, Retina display, Haptic touchscreen display and the like. In another embodiment of the present disclosure, the computing device 104 includes a basic display panel. Further, basic display panel includes but may not be limited to LCD, IPS-LCD, capacitive touchscreen LCD, resistive touchscreen LCD, and TFT-LCD.

The interactive computing environment 100 includes the at least one application 106. In an embodiment of the present disclosure, the application 106 is installed in the computing device 104. There may be multiple number of applications installed on the computing device 104. In another embodiment of the present disclosure, the application 106 is uninstalled from the computing device 104. In yet another embodiment of the present disclosure, the application 106 is reinstalled in the computing device 104. The application 106 is any software code that is programmed to interact with hardware elements of the computing device 104. Hardware elements refer to a plurality of memory types installed inside the computing device 104. Moreover, the application 106 is used to access, read, update and modify data stored in hardware elements of the computing device 104. In an embodiment of the present disclosure, the application 106 is any software code that interacts with random access memory of the computing device 104.

In an embodiment of the present disclosure, the application 106 includes but may not be limited to an over-the-top media application, an e-commerce application, a fintech application, a social media application, a health application, an educational application, a real estate and housing application, and a travel application. The application 106 may be any type of application well known in the art.

In an example, the application 106 is a DBMS application. DBMS stands for database management system. DBMS application is software subsystem used to store, retrieve and manipulate data stored in the database 114. In addition, data includes records, data pages, data containers, data objects and the like. In another example, the application 106 is a video streaming platform that the user 102 uses to play videos and web shows. In yet another embodiment of the present disclosure, the application 106 is a trading platform that allows the user 102 to buy and sell stocks. In yet another embodiment of the present disclosure, the application 106 is an e-commerce market platform that allows the user 102 to perform online shopping. In an example, the application 106 includes MySQL, MS-Access, Bookmyshow, Makemytrip, Amazon prime and the like.

Moreover, the application 106 provides a user interface to the user 102 to interact with hardware elements of the computing device 104. In an embodiment of the present disclosure, user interface includes Graphical User Interface (GUI). In another embodiment of the present disclosure, user interface includes Application Programming Interface (API). However, user interface is not limited to above-mentioned user interface. In addition, user interface facilitates to send or receive user commands and data. Further, user interface serves to display or return results of operations from the application 106.

In an embodiment of the present disclosure, the application 106 is an Android based application. In another embodiment of the present disclosure, the application 106 is an iOS based application. In yet another embodiment of the present disclosure, the application 106 is based on any other operating system of the like. In an embodiment of the present disclosure, the application 106 is installed in an Android smart phone. In another embodiment of the present disclosure, the application 106 is installed in an Android based smart TV. In yet another embodiment of the present disclosure, the application 106 is installed in an Android based smart watch. In yet another embodiment of the present disclosure, the application 106 is installed in an iPhone. In yet another embodiment of the present disclosure, the application 106 is installed in any other computing device of the like.

The interactive computing environment includes the communication network 108. The communication network 108 is part of network layer responsible for connection of two or more devices. Further, the communication network 108 may be any type of network. In an embodiment of the present disclosure, the type of communication network 108 is wireless mobile network. In another embodiment of the present disclosure, the type of communication network 108 is wired network with a finite bandwidth. In yet another embodiment of the present disclosure, the type of communication network 108 is combination of wireless and wired network for optimum throughput of data transmission. In yet another embodiment of the present disclosure, the type of communication network 108 is an optical fibre high bandwidth network that enables a high data rate with negligible connection drops.

The interactive computing environment 100 includes the user identification system 110. The user identification system 110 stores data of the user 102 associated with the at least one application 106. In an example, data of the user 102 includes name of the user 102, email address of the user 102, age of the user 102, folio number of the user 102, policy identity data of the user 102, contact number data of the user 102, images of the user 102, gender of the user 102, user activity data and user interest data. The user identification system 110 performs a method to identify the user 102 on the computing device 104 after reinstalling the application 106 on the computing device 104.

The user identification system 110 facilitates identification of the user 102 after uninstalling and reinstalling the application 106 on the computing device 104. In an embodiment of the present disclosure, the user identification system 110 performs the identification of the user 102 across multiple computing devices of the user 102 in an event of reinstalling the application 106 on a different computing device than the computing device 104. The user identification system 110 performs unification of data to identify the user 102 on the computing device 104 after reinstalling the application 106 on the computing device 104 adhering to GDPR compliance standard. The user identification system 110 performs unification of data based on anonymous and identified profiles.

In an example, user X installs the application 106 in the computing device 104. The user identification system 110 stores data of the user X associated with the application 106 as anonymous profile. In addition, the communication network 108 facilitates to transfer data from the computing device 104 to the server 112. Further, user X uninstalls the application 106 after say 3 days of usage of the application 106. Furthermore, user X reinstalls the application 106 in the computing device 104. The user identification system 110 identifies that same user X has reinstalled the application 106 on the computing device 104.

The user identification system 110 receives a first set of data associated with the computing device 104. The computing device 104 is associated with the user 102. The first set of data is unique identification information of the computing device 104 associated with the user 102. The first set of data includes at least one of AD-ID (advertising digital identifier) of the computing device 104, IDFA (identifier for advertisers) of the computing device 104, IMEI (international mobile equipment identity) of the computing device 104, or any other unique identification information associated with the computing device 104.

In an embodiment of the present disclosure, the user identification system 110 fetches AD-ID of the computing device 104 if the computing device 104 is an Android-based computing device 104. In another embodiment of the present disclosure, the user identification system 110 fetches IDFA of the computing device 104 if the computing device 104 is an iOS-based device.

AD-ID is a unique identifier used as an advertising industry standard. AD-ID is used to assure that correct assets are delivered to media by providing a central source for identification. IDFA is a random device identifier assigned to the computing device 104 of the user 102 by Apple. IDFA is used to identify and track the user 102 without revealing personal information of the user 102. IMEI is a factory installed unique serial number that identifies each unit or line of service under GSM (Global System for Mobile Communication) specifications.

The user identification system 110 maps the first set of data to a first natural number of a plurality of natural numbers using an increment sequence method. In general, natural numbers are positive integers such as 1, 2, 3, 4, 5, and the like. The increment sequence method enables generation of natural number of the plurality of natural numbers in incremented way in a number sequence.

In general, number sequence is a list of numbers that are associated by a rule. In an embodiment of the present disclosure, number sequence includes the plurality of natural numbers associated by a rule. In addition, the rule for the number sequence is to add 1 for every new installation of the application 106 in the computing device 104. The user identification system 110 maps the first set of data to the first natural number upon detection of anonymous profile.

In an example, a user U1 uses a computing device D1 (let's say an Android Smartphone) to access an application A1 (let's say an OTT platform). In addition, the user identification system 110 fetches AD-ID of the computing device D1. Further, the user identification system 110 maps AD-ID of the computing device D1 to 701. In another example, the user U1 uses a computing device D2 (let's say an iPhone) to access an application A2 (let's say an e-commerce platform). Furthermore, the user identification system 110 fetches IDFA of the computing device D2. Moreover, the user identification system 110 maps IDFA of the computing device D2 to 702.

The user identification system 110 performs hashing of the first set of data in real-time. The user identification system 110 performs the hashing of the first set of data using a hash function. The user identification system 110 performs hashing of the first set of data to enhance security of the first set of data.

The user identification system 110 assigns a first shard index of a plurality of shard indexes to the first set of data associated with the user 102 based on the first natural number of the plurality of natural numbers. In an embodiment of the present disclosure, the user identification system 110 assigns the first shard index of the plurality of shard indexes after the user 102 utilizes the application 106 to log in on the computing device 104. The first shard index of the plurality of shard indexes facilitates storage of the first set of data in corresponding shard of the plurality of shards based on shard indexing process. The user identification system 110 assigns the first shard index of the plurality of shard indexes upon installation of the application 106 for first time in the computing device 104 associated with the user 102. The user identification system 110 assigns the first shard index of the plurality of shard indexes to identify the user 102 as identified profile.

The shard indexing process utilizes a shard modular operation. The shard modular operation is based on number of the plurality of shards and number of the plurality of natural numbers. Also, the shard indexing process provides indexing settings to control allocation of the plurality of shards to the first set of data, and the second set of data. In general, sharding is horizontal database partitioning method that separates large databases into smaller databases. The user identification system 110 stores the first shard index of the plurality of shard indexes associated with the first set of data of the computing device 104 at the server 112. Further, the user 102 uninstalls the application 106 from the computing device 104.

In an example, the user 102 uninstalls the application 106 from the computing device 104 after 1 hour of installation of the application 106. In another example, the user 102 uninstalls the application 106 from the computing device 104 after 1 year of installation of the application 106. In yet another example, the user 102 uninstalls the application 106 from the computing device 104 after 10 years of installation of the application 106. Furthermore, the user 102 reinstalls the application 106 in the computing device 104.

In an example, the user 102 reinstalls the application 106 in the computing device 104 after 1 hour of uninstallation of the application 106. In another example, the user 102 reinstalls the application 106 in the computing device 104 after 1 year of uninstallation of the application 106. In yet another example, the user 102 reinstalls the application 106 in the computing device 104 after 10 years of uninstallation of the application 106.

The server 112 requests the first set of data from the computing device 104 to identify the computing device 104 associated with the user 102. The user identification system 110 sends the first shard index of the plurality of shard indexes to the server 112 upon request from the server 112. The first shard index of the plurality of shard indexes sent to the server 112 adheres to GDPR compliance standard.

The user identification system 110 obtains a second set of data associated with the at least one computing device 104 of the user 102. The computing device 104 is associated with the user 102. The user identification system 110 maps the second set of data to a second natural number of the plurality of natural numbers. The second set of data is associated with the computing device 104 of the user 102. The second set of data is unique identification information of the user 102. The user identification system 110 performs the mapping based on information of the first shard index of the plurality of shard indexes. The user identification system 110 performs the mapping after reinstalling the application 106 in the computing device 104. The user identification system 110 performs the mapping upon detection that hash of the second set of data equals hash of the first set of data and the hash of the first set of data is already stored at the server 112. The user identification system 110 performs the mapping such that data associated with the computing device 104 of the user 102 is stored in the first shared index of the plurality of shard indexes.

The user identification system 110 performs unification of the first natural number and the second natural number to identify and associate the first shard index of the plurality of shard indexes to the user 102 after reinstallation of the application 106 in the computing device 104.

The user identification system 110 generates the second natural number of the plurality of natural numbers in real-time. The user identification system 110 utilizes the shard modular operation to generate the second natural number of the plurality of natural numbers. The mapping is performed such that the second set of data is stored in the first shard index of the plurality of shard indexes. The hash of the second set of data equals the hash of the first set of data. The user identification system 110 stores the second set of data in the same first shard index of the plurality of shard indexes based on the hash of the first set of data. The hash of the first set of data for the computing device 104 always remains same irrespective of factors such as date, time, number of applications installed in the computing device 104 and the like.

In an example, number of shards of the plurality of shards is 3. The user identification system 110 maps the first set of data (AD-ID) of the computing device D1 in shard index 2. The user identification system 110 performs the mapping of the AD-ID of the computing device D1 in shard index 2 in real-time. The user identification system 110 performs the mapping based on mathematical formulation 701 modulo 3.

In addition, the user identification system 110 maps the first set of data (IDFA) of the computing device D2 in shard index 0. The user identification system 110 performs the mapping of the IDFA of the computing device D2 in shard index 0 in real-time. The user identification system 110 performs the mapping based on mathematical formulation 702 modulo 3.

Further, the user U1 uninstalls the application A1 from the computing device D1 after 5 days. Furthermore, the user U1 reinstalls the application A1 in the computing device D1 after 1 year of uninstalling the application A1. The user identification system 110 fetches the second set of data from the computing device D1. The user identification system 110 determines that hash of the second set of data equals the hash of the first set of data and the hash of the first set of data is already present in the server 112 in shard index 2. Moreover, the user identification system 110 performs mapping of the second set of data to a second natural number such that the second set of data is stored in the first shard index (2) of the plurality of shard indexes. In an example, the user identification system 110 maps the second set of data to second natural number 1502 based on mathematical formulation 1502 modulo 3. Also, the user identification system 110 maps the second set of data to same shard index every time the application A1 is uninstalled and reinstalled in the same computing device D1.

Further, the user U2 uninstalls the application A2 from the computing device D2 after 4 hours. Furthermore, the user U2 reinstalls the application A2 in the computing device D2 after 10 years of uninstalling the application A2. The user identification system 110 fetches the second set of data from the computing device D2. The user identification system 110 determines that the hash of the second set of data equals the hash of the first set of data and the hash of the first set of data is already present in the server 112 in shard index 0. Moreover, the user identification system 110 performs mapping of the second set of data to a second natural number such that the hash of the second set of data is stored in the first shard index (0) of the plurality of shard indexes. In an example, the user identification system 110 maps the second set of data to second natural number 51000 based on mathematical formulation 51000 modulo 3. Also, the user identification system 110 maps the second set of data to same shard index every time the application A2 is uninstalled and reinstalled in the same computing device D2.

In an example, the user identification system 110 sends shard index 2 for the computing device D1 to the server 112 and not the AD-ID of the computing device D1. The hash of the AD-ID of the computing device D1 is stored in the shard index 2 at the server 112. In addition, the user identification system 110 sends shard index 0 for the computing device D2 to the server 112 and not the IDFA of the computing device D2. The hash of the IDFA of the computing device D2 is stored in the shard index 0 at the server 112.

The user identification system 110 sends the shard index instead of sending the unique identifier information of the computing device 104 to adhere to GDPR compliance standard. GDPR stands for General Data Protection Regulation. In general, GDPR is a protection in EU law for data protection and privacy of information of the user 102.

The user identification system 110 derives the first shard index of the plurality of shard indexes in real-time after the user 102 reinstalls the application 106 in the computing device 104. The user identification system 110 minimizes data migration and data loss at the server 112 after uninstalling and reinstalling of the application 106 at the computing device 104 of the user 102.

The user identification system 110 assigns the first shard index of the plurality of shard indexes to the second set of data associated with the user 102. The first shard index of the plurality of shard indexes facilitates storing of data of the user 102 in same shard of the plurality of shard indexes based on shard indexing process.

The shard indexing process facilitates the user identification system 110 to store the first set of data and the second set of data in same shard of the plurality of shards. The shard indexing process utilizes modulo operation on the first set of data and the second set of data to allocate corresponding shard of the plurality of shards. In an embodiment of the present disclosure, number of the plurality of shard indexes depend on the first set of data.

The user identification system 110 is associated with the server 112 and the computing device 104 of the user 102. The server 112 is a computer program or device that provides functionality for other programs or devices. The server 112 connects with the computing device 104 using the communication network 108. The server 112 provides various functionalities, such as sharing data or resources among multiple clients, or performing computation for a client or the user 102. It is shown in FIG. 1 that the user identification system 110 is connected with the single server 112. However, those skilled in the art would appreciate that the user identification system 110 may be connected to more number of servers.

The server 112 includes the database 114. The database 114 is an organized collection of data. The database 114 stores different sets of information associated with various components of the user identification system 110. The database 114 is used to store general information and specialized data. The user identification system 110 stores the first set of data and the second set of data in the database 114. The database 114 organizes data using models such as relational models or hierarchical models. In addition, the database 114 stores data provided by an administrator. It is shown in FIG. 1 that the user identification system 110 is connected with the single database 114. However, those skilled in the art would appreciate that the user identification system 110 may be connected to more number of databases.

In an embodiment of the present disclosure, the user identification system 110 is installed at the server 112. In another embodiment of the present disclosure, the user identification system 110 is connected with the server 112. In yet another embodiment of the present disclosure, the user identification system 110 is part of the server 112. In yet another embodiment of the present disclosure, the user identification system 110 is associated with the computing device 104 of the user 102. The server 112 handles each operation and task performed by the user identification system 110. The server 112 stores one or more instructions to perform various operations of the user identification system 110. In an embodiment of the present disclosure, the server 112 is located remotely from the user identification system 110.

The server 112 is associated with the administrator. In general, administrator manages different components of the server 112. The administrator coordinates activities of components associated with the user identification system 110. The administrator is any person or individual who monitors working of the user identification system 110 and the server 112 in real-time. The administrator monitors proper working and functioning of the user identification system 110 and the server 112. The administrator is any person or individual who is responsible for troubleshooting and upkeep of the user identification system 110 and the server 112. The administrator is a client or an organization that wants to utilize the user identification system 110.

FIGS. 2A and 2B illustrate a flow chart of a method for performing identification of the user 102 on the at least one computing device 104 after reinstalling of the at least one application 106 on the at least one computing device 104, in accordance with various embodiments of the present disclosure. It may be noted that to explain the process steps of flowchart 200, references will be made to the system elements of FIG. 1.

The flowchart 200 initiates at step 202. Following step 202, at step 204, the user identification system 110 receives the first set of data associated with the computing device 104. In addition, at step 206, the user identification system 110 maps the first set of data to the first natural number of the plurality of natural numbers using the increment sequence method. Further, at step 208, the user identification system 110 performs hashing of the first set of data in real-time. Furthermore, at step 210, the user identification system 110 assigns the first shard index of the plurality of shard indexes to the first set of data based on the first natural number of the plurality of natural numbers. Moreover, at step 212, the user identification system 110 sends the first shard index of the plurality of shard indexes to the server 112 upon request from the server 112. Also, at step 214, the user identification system 110 maps the second set of data to the second natural number of the plurality of natural numbers. The flowchart 200 terminates at step 216.

FIG. 3 illustrates the block diagram of a computing device 300, in accordance with various embodiments of the present disclosure. The computing device 300 depicts internal components of the computing device 104. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for performing unification of data for identifying a user on at least one computing device after reinstalling at least one application on the at least one computing device adhering to General Data Protection Regulation (GDPR) compliance, the computer-implemented method comprising:
receiving, at a user identification system with a processor, a first set of data associated with the at least one computing device, wherein the computing device is associated with the user, wherein the first set of data is unique identification information of the computing device associated with the user;
mapping, at the user identification system with the processor, the first set of data to a first natural number of a plurality of natural numbers using an increment sequence method, wherein the increment sequence method enables generation of natural number of the plurality of natural numbers in an incremented way in a number sequence;
hashing, at the user identification system with the processor, the first set of data in real-time, wherein the user identification system performs the hashing of the first set of data using a hash function, wherein the user identification system performs hashing of the first set of data for enhancing security of the first set of data;

assigning, at the user identification system with the processor, a first shard index of a plurality of shard indexes to the first set of data based on the first natural number of the plurality of natural numbers, wherein the first shard index of the plurality of shard indexes facilitates storing of the first set of data in corresponding shard of the plurality of shards based on shard indexing process, wherein the first shard index of the plurality of shard indexes is assigned upon installation of the application for first time in the computing device associated with the user, wherein the shard indexing process utilizes a shard modular operation, wherein the shard modular operation is based on number of the plurality of shards and number of the plurality of natural numbers;

sending, at the user identification system with the processor, the first shard index of the plurality of shard indexes to a server upon a request from the server, wherein the sending of the first shard index of the plurality of shard indexes adheres to the GDPR compliance standard;

obtaining, at the user identification system with the processor, a second set of data associated with the at least one computing device of the user, wherein the computing device is associated with the user;

mapping, at the user identification system with the processor, a second set of data to a second natural number of the plurality of natural numbers, wherein the mapping is performed based on information of the first shard index of the plurality of shard indexes, wherein the mapping is performed after reinstalling of the application in the computing device, wherein the mapping is performed upon detection that hash of the second set of data equals hash of the first set of data and the hash of the first set of data is already stored at the server;

unifying, at the user identification system with the processor, the first natural number and the second natural number for identifying and associating the first shard index of the plurality of shard indexes for the user after reinstalling of the application in the computing device; and assigning, at the user unification system with the processor, the first shard index of the plurality of shard indexes to the second set of data associated with the user, wherein the first shard index of the plurality of shard indexes facilitates storing of data of the user in same shard of the plurality of shard indexes based on shard indexing process.

2. The computer-implemented method as recited in claim 1, wherein the first set of data comprising at least one of AD-ID (advertising digital identifier) of the computing device, IDFA (identifier for advertisers) of the computing device, IMEI (international mobile equipment identity) of the computing device, or any other unique identification information associated with the computing device.

3. The computer-implemented method as recited in claim 1, wherein the user identification system derives the first shard index of the plurality of shard indexes in real-time after reinstalling the application in the computing device associated with the user, wherein the user identification system derives the first shard index of the plurality of shard indexes based on checking of the second set of data already stored at the server.

4. The computer-implemented method as recited in claim 1, wherein the user identification system minimizes data migration and data loss at the server after uninstalling and reinstalling of the application at the computing device of the user.

5. The computer-implemented method as recited in claim 1, wherein the shard indexing process enables the user identification system for storing the first set of data and the second set of data in same shard of the plurality of shards, wherein the shard indexing process utilizes modulo operation on the first set of data and the second set of data for allocating corresponding shard of the plurality of shards.

6. The computer-implemented method as recited in claim 1, wherein number of the plurality of shard indexes depend on the first set of data.

7. A computer system comprising:
one or more processors; and
a memory coupled to the one or more processors, the memory for storing instructions which, when executed by the one or more processors, cause the one or more processors to perform a method for performing unification of data for identifying a user on at least one computing device after reinstalling at least one application on the at least one computing device adhering to General Data Protection Regulation (GDPR) compliance, the method comprising:

receiving, at a user identification system, a first set of data associated with the at least one computing device, wherein the computing device is associated with the user, wherein the first set of data is unique identification information of the computing device associated with the user;

mapping, at the user identification system, the first set of data to a first natural number of a plurality of natural numbers using an increment sequence method, wherein the increment sequence method enables generation of natural number of the plurality of natural numbers in an incremented way in a number sequence;

hashing, at the user identification system, the first set of data in real-time, wherein the user identification system performs the hashing of the first set of data using a hash function, wherein the user identification system performs hashing of the first set of data for enhancing security of the first set of data;

assigning, at the user identification system, a first shard index of a plurality of shard indexes to the first set of data based on the first natural number of the plurality of natural numbers, wherein the first shard index of the plurality of shard indexes facilitates storing of the first set of data in corresponding shard of the plurality of shards based on shard indexing process, wherein the first shard index of the plurality of shard indexes is assigned upon installation of the application for first time in the computing device associated with the user, wherein the shard indexing process utilizes a shard modular operation, wherein the shard modular operation is based on number of the plurality of shards and number of the plurality of natural numbers;

sending, at the user identification system, the first shard index of the plurality of shard indexes to a serverupon a request from the server, wherein the sending of the first shard index of the plurality of shard indexes adheres to the GDPR compliance standard;

obtaining, at the user identification system, a second set of data associated with the at least one computing device of the user, wherein the computing device is associated with the user;

mapping, at the user identification system, a second set of data to a second natural number of the plurality of natural numbers, wherein the mapping is performed based on information of the first shard index of the plurality of shard indexes, wherein the mapping is performed after reinstalling of the application in the computing device, wherein the mapping is performed upon detection that hash of the second set of data equals hash of the first set of data and the hash of the first set of data is already stored at the server;

unifying, at the user identification system, the first natural number and the second natural number for identifying and associating the first shard index of the plurality of shard indexes for the user after reinstalling of the application in the computing device; and assigning, at the user unification system, the first shard index of the plurality of shard indexes to the second set of data associated with the user, wherein the first shard index of the plurality of shard indexes facilitates storing of data of the user in same shard of the plurality of shard indexes based on shard indexing process.

8. The computer system as recited in claim 7, wherein the first set of data comprising at least one of AD-ID (advertising digital identifier) of the computing device, IDFA (identifier for advertisers) of the computing device, IMEI (international mobile equipment identity) of the computing device, or any other unique identification information associated with the computing device.

9. The computer system as recited in claim 7, wherein the user identification system derives the first shard index of the plurality of shard indexes in real-time after reinstalling the application in the computing device associated with the user, wherein the user identification system derives the first shard index of the plurality of shard indexes based on checking of the second set of data already stored at the server.

10. The computer system as recited in claim 7, wherein the user identification system minimizes data migration and data loss at the server after uninstalling and reinstalling of the application at the computing device of the user.

11. The computer system as recited in claim 7, wherein the shard indexing process enables the user identification system for storing the first set of data and the second set of data in same shard of the plurality of shards, wherein the shard indexing process utilizes modulo operation on the first set of data and the second set of data for allocating corresponding shard of the plurality of shards.

12. The computer system as recited in claim 7, wherein number of the plurality of shard indexes depend on the first set of data.

13. A non-transitory computer-readable storage medium encoding computer executable instructions that, when executed by at least one processor, performs a method for performing unification of data for identifying a user on at least one computing device after reinstalling at least one application on the at least one computing device confirming to General Data Protection Regulation (GDPR) compliance, the method comprising:

receiving, at a computing device, a first set of data associated with the at least one computing device, wherein the computing device is associated with the user, wherein the first set of data is unique identification information of the computing device associated with the user;

mapping, at the computing device, the first set of data to a first natural number of a plurality of natural numbers using an increment sequence method, wherein the increment sequence method enables generation of natural number of the plurality of natural numbers in an incremented way in a number sequence;

hashing, at the computing device, the first set of data in real-time, wherein the user identification system performs the hashing of the first set of data using a hash function, wherein the user identification system performs hashing of the first set of data for enhancing security of the first set of data;

assigning, at the computing device, a first shard index of a plurality of shard indexes to the first set of data based on the first natural number of the plurality of natural numbers, wherein the first shard index of the plurality of shard indexes facilitates storing of the first set of data in corresponding shard of the plurality of shards based on shard indexing process, wherein the first shard index of the plurality of shard indexes is assigned upon installation of the application for first time in the computing device associated with the user, wherein the shard indexing process utilizes a shard modular operation, wherein the shard modular operation is based on number of the plurality of shards and number of the plurality of natural numbers;

sending, at the computing device, the first shard index of the plurality of shard indexes to a server upon a request from the server, wherein the sending of the first shard index of the plurality of shard indexes adheres to the GDPR compliance standard;

obtaining, at the computing device, a second set of data associated with the at least one computing device of the user, wherein the computing device is associated with the user;

mapping, at the computing device, a second set of data to a second natural number of the plurality of natural numbers, wherein the mapping is performed based on information of the first shard index of the plurality of shard indexes, wherein the mapping is performed after reinstalling of the application in the computing device, wherein the mapping is performed upon detection that hash of the second set of data equals hash of the first set of data and the hash of the first set of data is already stored at the server;

unifying, at the computing device, the first natural number and the second natural number for identifying and associating the first shard index of the plurality of shard indexes for the user after reinstalling of the application in the computing device; and assigning, at the computing device, the first shard index of the plurality of shard indexes to the second set of data associated with the user, wherein the first shard index of the plurality of shard indexes facilitates storing of data of the user in same shard of the plurality of shard indexes based on shard indexing process.

14. The non-transitory computer-readable storage medium as recited in claim 13, wherein the first set of data comprising at least one of AD-ID (advertising digital identifier) of the computing device, IDFA (identifier for advertisers) of the computing device, IMEI (international mobile equipment identity) of the computing device, or any other unique identification information associated with the computing device.

15. The non-transitory computer-readable storage medium as recited in claim 13, wherein the user identification system derives the first shard index of the plurality of shard indexes in real-time after reinstalling the application in the computing device associated with the user, wherein the user identification system derives the first shard index of the plurality of shard indexes based on checking of the second set of data already stored at the server.

16. The non-transitory computer-readable storage medium as recited in claim 13, wherein the user identification system minimizes data migration and data loss at the server after uninstalling and reinstalling of the application at the computing device of the user.

17. The non-transitory computer-readable storage medium as recited in claim 13, wherein the shard indexing process enables the user identification system for storing the first set of data and the second set of data in same shard of the plurality of shards, wherein the shard indexing process utilizes modulo operation on the first set of data and the second set of data for allocating corresponding shard of the plurality of shards.

18. The non-transitory computer-readable storage medium as recited in claim 13, wherein number of the plurality of shard indexes depend on the first set of data.

* * * * *